US012752922B2

(12) United States Patent
Makhe et al.

(10) Patent No.: US 12,752,922 B2
(45) Date of Patent: Oct. 6, 2026

(54) ICE PROTECTION SYSTEM USING WASTE HEAT RECOVERY

(71) Applicant: Eaton Intelligent Power Limited, Dublin (IE)

(72) Inventors: Sunil Madhukar Makhe, Pune (IN); Parimal Maity, Pune (IN); Christopher T. Cantrell, Jackson, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 19/232,485

(22) Filed: Jun. 9, 2025

(65) Prior Publication Data

US 2025/0382062 A1 Dec. 18, 2025

(30) Foreign Application Priority Data

Jun. 12, 2024 (IN) ............................. 202411045215

(51) Int. Cl.
*B64D 15/02* (2006.01)
*B64D 27/34* (2024.01)

(52) U.S. Cl.
CPC ............. *B64D 15/02* (2013.01); *B64D 27/34* (2024.01)

(58) Field of Classification Search
CPC ................................ B64D 15/02; B64D 27/34
See application file for complete search history.

(56) References Cited

U.S. PATENT DOCUMENTS

| | | | | |
|---|---|---|---|---|
| 8,402,776 | B2 * | 3/2013 | Johnston | B60L 50/40 62/79 |
| 8,967,543 | B2 * | 3/2015 | Saito | B64D 15/04 239/599 |
| 9,976,481 | B2 * | 5/2018 | Botura | F01D 25/02 |
| 10,696,412 | B2 | 6/2020 | Mackin | |
| 2005/0128705 | A1 * | 6/2005 | Chu | H01L 23/473 361/689 |
| 2012/0048509 | A1 * | 3/2012 | Weber | B64D 11/0015 165/104.19 |
| 2019/0118957 | A1 * | 4/2019 | Thomassin | B64D 27/04 |
| 2020/0377222 | A1 * | 12/2020 | Colmagro | B64D 27/402 |
| 2022/0055762 | A1 * | 2/2022 | Clarke | F04D 25/06 |
| 2023/0067744 | A1 * | 3/2023 | Cantrell | H01M 10/625 |
| 2023/0070111 | A1 * | 3/2023 | Jain | H01M 10/625 |

FOREIGN PATENT DOCUMENTS

| | | | | |
|---|---|---|---|---|
| CN | 105366028 A | | 3/2016 | |
| CN | 105416563 A | | 3/2016 | |
| CN | 105416591 A | | 3/2016 | |
| EP | 3480114 B1 | * | 3/2020 | H01M 10/625 |
| EP | 3789301 A1 | * | 3/2021 | B64D 27/34 |
| GB | 2314887 A | * | 1/1998 | F02C 7/047 |
| GB | 2593445 A | | 9/2021 | |
| WO | 2021/064386 A2 | | 4/2021 | |
| WO | 2021/095395 A1 | | 5/2021 | |
| WO | 2022/184325 A1 | | 9/2022 | |

* cited by examiner

*Primary Examiner* — Justin M Benedik
(74) *Attorney, Agent, or Firm* — Merchant & Gould P.C.

(57) ABSTRACT

An ice protection system for use with an aircraft including an electric motor for driving a propulsion structure of the aircraft. The electric motor is cooled by a heat transfer fluid that flows through or by the electric motor to extract heat from the electric motor. The ice protection system uses the heat transfer fluid heated by the electric motor to provide anti-icing and de-icing functionality.

18 Claims, 5 Drawing Sheets

ICE PROTECTION SYSTEM USING WASTE HEAT RECOVERY

CROSS-REFERENCE TO RELATED APPLICATION

This application claims the benefit of Indian Provisional Patent Application Ser. No. 202411045215, filed on Jun. 12, 2024, the disclosure of which is incorporated herein by reference in its entirety.

BACKGROUND

Systems for recovering waste heat to be used for other functionalities are known. For example, EP3789301, US2020/0377222 and US2023/0070111 disclose systems for using heat from an electric motor of an aircraft to provide additional functionality such as de-icing.

SUMMARY

An ice protection system for use with an aircraft including an electric motor for driving a propulsion structure of the aircraft. The electric motor is cooled by a heat transfer fluid that flows through or by the electric motor to extract heat from the electric motor. The ice protection system uses the heat transfer fluid heated by the electric motor to provide anti-icing and de-icing functionality.

One aspect of the present disclosure relates to an ice protection system configured to use waste heat to prevent ice from forming (anti-icing) or to melt formed ice (de-icing). In certain examples, the ice protection system can be used on an electric power aircraft such as an electric vertical takeoff and landing (eVTOL) aircraft. In certain examples, the ice protection system can use heat from an electric motor and inverter used to power a propulsion component (e.g., a propulsion rotor) of the aircraft. In certain examples, the ice protection system can also use heat from one or more batteries. In certain examples, a skin-type heat exchanger can be used to transfer heat to portions of the aircraft subject to icing such as the wings, the tail, the pylons, and the nacelle. In certain examples, the skin-type heat exchanger can define a plurality of passages through which a heat transfer fluid (e.g., a glycol-based fluid) flows. In one example, the skin-type heat exchanger can have a composite construction having different materials that cooperate to define the passages. In certain examples, the composite construction can include a manifold structure (e.g., a molded structure that may be made of a lower density material such as a non-metal material that may include a plastic material) having a first conductivity that cooperates with a heat transfer layer (e.g., a heat spreader that can include a higher density material such as a metal layer such as copper or aluminum or a thermally conductive composite) having a second conductivity higher than the first conductivity to define the passages. In one example, the heat transfer layer can have a relatively thin, sheet-like construction. In certain examples, the passages can define a primary flow path and a secondary flow path. In certain examples the primary flow path provides an anti-icing function while the secondary flow path provides a de-icing function.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

FIG. 1 is a schematic diagram of an ice protection system in accordance with the principles of the present disclosure;

FIG. 2 schematically depicts an aircraft component (e.g., a wing) having an example heat transfer structure having anti-icing and de-icing flow paths;

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
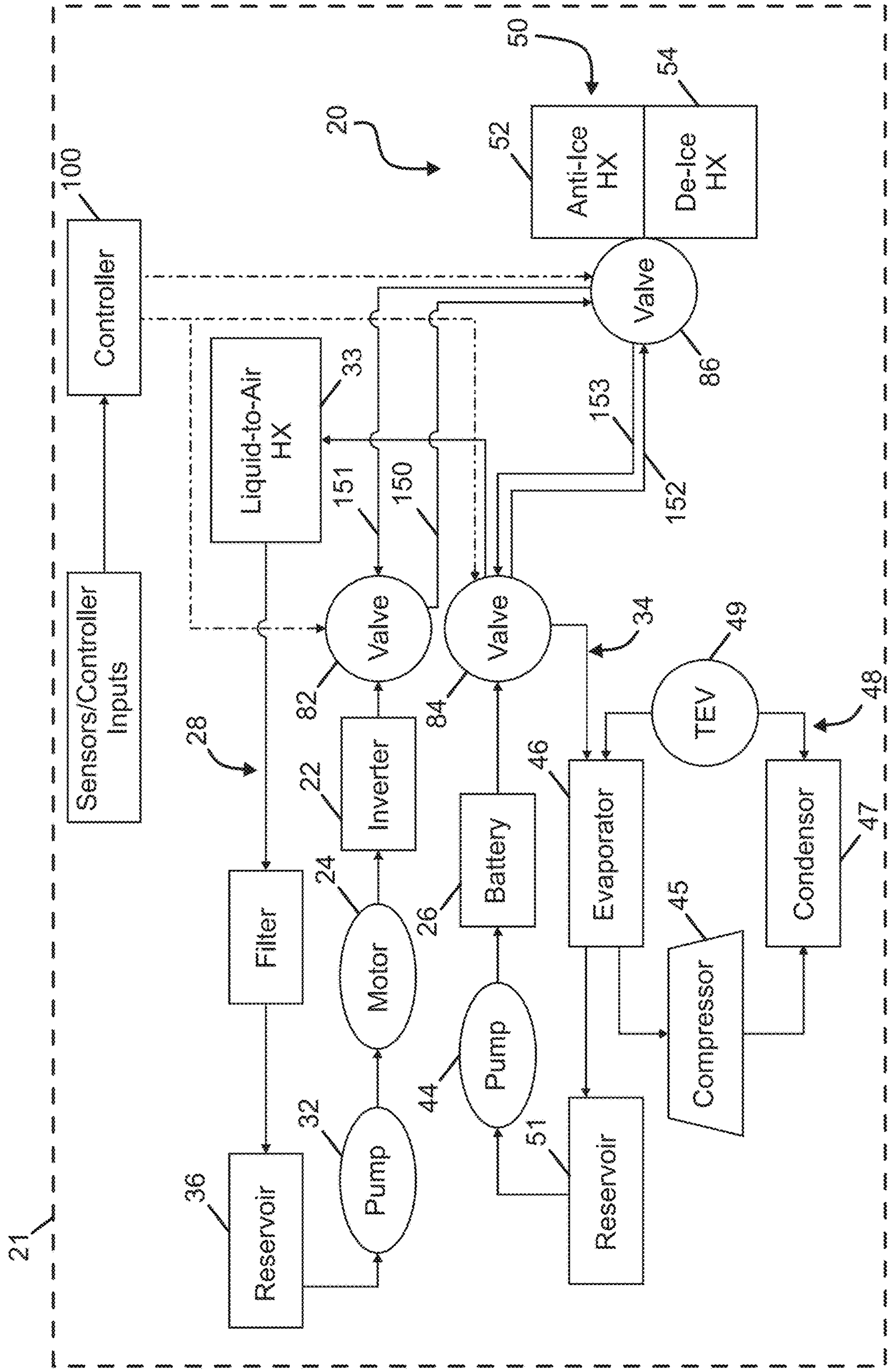

FIG. 1 depicts an ice protection system 20 in accordance with the principles of the present disclosure. The ice protection system 20 can be used on an aircraft to provide anti-icing and de-icing functionality. In certain examples, the anti-icing and de-icing functionality can provide heating to all regions of the aircraft prone to icing such as the wings, the pylons, the nacelles, and the tail. In certain examples, heat transfer structures can be provided adjacent the leading edges of the wings and/or at the tips of the wings. In certain examples, the heat transfer structures can be positioned beneath the leading edges of the wings or can wrap around the leading edges of the wings. In certain examples, the aircraft can be an aircraft including electrically powered propulsion such as an eVTOL aircraft.

Certain aspects of the present disclosure relate to an ice protection system for an electrically powered aircraft that transfers heat from electronics such as an electric propulsion motor, inverter and battery to regions prone to icing such as the wings, pylons, the tail and the nacelles. In certain examples, a controller can manage, proportion, redistribute and/or split the flow of heat transfer fluid (e.g., coolant) toward heat transfer structures of the ice protection systems pursuant to system requirements. In certain examples, the heat transfer structures can include skin heat exchangers that direct heat to a skin of the aircraft. In certain examples, the heat transfer structures can include primary and secondary flow paths with the primary flow path being adapted for anti-icing and the secondary flow path adapted for de-icing. Anti-icing systems are adapted to prevent ice from forming and de-icing system are adapted to promote the shedding of ice that has begun to form. For example, a de-icing system can be configured to melt the ice at the interface between the ice and the aircraft to facilitate ice shedding (e.g., facilitate causing the ice to blow off).

In certain examples, control of flow of heat transfer fluid through the primary and secondary flow paths can be coordinated to provide a level of heat flux that corresponds to environmental conditions encountered. In certain examples, the primary flow path can provide heat flux up to a first level (e.g., to provide an anti-icing function) and the secondary flow path can provide additional heat flux added to the heat flux provided by the primary flow path (e.g., to provide a de-icing function) to provide heat flux to a second level higher than the first level under conditions in which the first level of heat flux is insufficient to prevent icing. In certain examples, flow through the primary and secondary flow paths is separately controlled so that different flow rates can be provided through the primary and secondary flow paths and/or different flow control protocols can be used for the primary flow path as compared to the secondary flow path. In some examples, the primary and secondary flow paths can be independently controlled. In some examples, the primary flow path can be operated more frequently or for longer durations than the secondary flow path. In some examples, the primary flow path and/or the secondary flow path can be operated continuously or intermittently during flight. In some examples, a flow rate through the primary flow path and/or the secondary flow path can be varied based on environmental conditions. In some examples, a duration of an on-duty cycle verses an off-duty cycle of the primary flow path and/or the secondary flow path can be varied based on environmental conditions. In certain examples, heat transfer fluid is normally routed through the primary flow path during flight and is routed through the secondary flow path (e.g., intermittently; continuously) during flight based on environmental conditions. In certain examples, heat transfer fluid is routed through the primary flow path (e.g., continuously, intermittently, etc.) during flight and is routed through the secondary flow path during flight only when environmental conditions dictate that de-icing is advisable. In certain examples, the primary and secondary flow paths can be independently powered on and off as required to achieve their heating function while minimizing power consumption. In certain examples, the primary and secondary flow paths define different heating zones with the different heating zones being capable of accommodating different flow rates (e.g., variable flow rates) at the different heating zones. In certain examples, the primary and secondary flow paths define different heating zones with flow through the different heating zones being separately controllable to provide separately controlled heat fluxes at the different heating zones.

In certain examples, the heat transfer structure can have a composite construction including at least a first portion constructed of a lower density (e.g., non-metal) material and a second portion constructed of a more thermally conductive material (e.g., a metal material). The composite construction of the heat transfer structure can assist in optimizing/reducing the weight of the heat transfer structure. In certain examples, the thermally conductive material can be constructed as a relatively thin heat spreader having a sheet-like configuration that extends along flow paths of the heat transfer structure and enhances the overall heat transfer effectiveness of the heat transfer structure. The heat spreader can be secured adjacent an interior surface of a skin of the aircraft so that heat is distributed through the skin to facilitate anti-icing or de-icing at an exterior surface of the skin. While a variety of configurations can be implemented, in one example, the primary flow path can run along a span of a structure desired to be kept free of ice (e.g., along a wing leading edge extending along the length of the wing) and can also have a chordwise distribution at regular intervals (e.g., can extend along a width of the wing that extends between a leading edge and a trailing edge of the wing). The secondary flow path can help in shedding local ice and can be adapted to heat aircraft surfaces not serviced by the primary flow path and/or can provide additional heat to areas adjacent the primary flow path. In certain examples, the primary flow path and/or the secondary flow path can wrap around a leading edge of an aircraft wing and can extend along the width orientation of the wing at top and bottom sides of the wing. In certain examples, the primary and secondary flow paths are alternated with respect to each other in an orientation that extends along the length/span of the wing with the primary and secondary flow paths themselves extending in an orientation along the width of the wing. In certain examples, an electric heating system can be provided to supplement heating provided by the primary and secondary flow paths. In certain examples, the primary flow path can include at least a portion that extends along a leading edge of a wing (e.g., in an orientation that extends from a base to a tip of the wing) and/or can include at least a portion that extends across a width of the wing (e.g., in an orientation that extends from a leading edge to a trailing edge of the wing). In certain examples, the secondary flow path can include at least a portion that extends along a leading edge of a wing (e.g., in an orientation that extends from a base to a tip of the wing) and/or can include at least a portion that extends across a width of the wing (e.g., in an orientation that extends from a leading edge to a trailing edge of the wing). In certain examples, the primary and the secondary flow paths can each include at least a portion that extends along a leading edge of a wing and/or can each include at least a portion that extends across a width of the wing.

Certain aspects of the present disclosure relate to an ice protection system that utilizes heat generated from the electric motor and/or inverter of an eVTOL aircraft by directing heated heat transfer fluid (e.g., glycol-based fluid) exiting the motor and/or inverter toward a heat exchanger (e.g., a skin heat exchanger) located at a region of the aircraft prone to icing (e.g., the wings). The electric motor can power a propulsion structure of the aircraft and can be referred to as an electric propulsion motor. In certain examples, the ice protection system can also optionally use heat generated by a battery powering the electric propulsion motor by directing heat transfer fluid heated by the battery (e.g., that flows through a battery cooling loop) toward the heat exchanger. In certain examples, the heat exchanger includes combination of primary and secondary flow paths serving as an energy-efficient solution by combining the advantages of de-icing and anti-icing. In certain examples, smart architecture including a system controller, fluid conveyance system and a skin heat exchanger helps reduce overall weight and additional power source requirements without compromising flight duration, and also reduces the load on thermal management systems corresponding to electronic components such as the propulsion motor/inverter and battery. In certain examples, a heat spreading arrangement can improve overall heat transfer and reduce total weight of the design architecture. In certain examples, the system can effectively reduce battery power consumption for de-icing and anti-icing and can reduce weight by eliminating electric heaters or minimizing the size of the electric heaters (e.g., resistive heaters). In certain examples, the icing and/or anti-icing can be achieved by re-purposing heat generated by a propulsion motor/inverter and/or battery using smart architecture that includes an intelligent controller, fluid conveyance arrangement and a heat exchanger such as a skin-type heat exchanger.

Referring to FIG. 1, the ice protection system 20 is incorporated as part of an aircraft 21 such as an electric powered aircraft (e.g., an eVTOL aircraft). The ice protection system 20 allows the aircraft 21 to operate in cold weather climate conditions. The aircraft 21 includes an inverter 22 controlling an electric motor 24 for driving a structure of the aircraft such as a propulsion structure (e.g., a propeller). The electric motor 24 can be powered by a battery 26. The aircraft 21 includes a first cooling loop 28 for cooling the electric motor 24 and the inverter 22 and a second cooling loop 34 cooling the battery 26. The first cooling loop 28 includes a pump 32 for pumping a heat transfer fluid (e.g., a coolant fluid such as a glycol-based fluid) through the electric motor 24, the inverter 22 and a thermal management system 33. The thermal management system 33 can include one or more air-cooled heat exchangers for transferring heat from the heat transfer fluid to ambient air. The heat transfer fluid cooled at the thermal management system 33 can be conveyed to a reservoir 36 in fluid communication with an intake of the pump 32. The thermal management system 33 can be sized taking into consideration a fluid cooling capability/capacity of the ice protection system 20 thereby allowing the thermal management system 33 to be smaller (e.g., lighter) than if the ice protection system were not present. The second cooling loop 34 includes a pump 44 pumping heat transfer fluid across the battery 26 and through a chiller 46 (e.g., an evaporator) for cooling the heat transfer fluid. Heat transfer fluid exiting the chiller 46 can be routed to a reservoir 51 that is in fluid communication with an intake of the pump 44. The chiller 46 can be part of a refrigeration loop 48 including a compressor 45, a condenser 47 (e.g., an air-cooled condenser) and a thermal expansion valve 49.

It will be appreciated that the heat transfer fluid in each of the first and second cooling loops 28, 34 can have different average temperatures. For example, the heat transfer fluid of the first cooling loop 28 can have a higher temperature than the heat transfer fluid of the second cooling loop 34. Hence, for certain applications it is desirable to keep the first and second cooling loops 28, 34 separate from one another with separate reservoirs 36, 51 rather than a shared reservoir. In other examples, the cooling loops 28, 34 could be merged (e.g., could share a common reservoir). In certain examples, fluid from one of the cooling loops 28, 34 can be used to direct heat to one or more flow paths of a heat exchanger arrangement of an anti-icing zone and fluid from the other of the cooling loops 28, 34 can be used to direct heat to one or more flow paths of a heat exchanger arrangement of de-icing zone. In certain examples, fluid from one of the cooling loops 28, 34 can be used to direct heat to one or more flow paths of heat exchanger arrangements of both the anti-icing zone and the de-icing zone, and the other of the cooling loops 28, 34 is available as a back-up for directing heat to one or more flow paths of heat exchanger arrangements of both the anti-icing zone and the de-icing zone. In other examples, based on monitored conditions (e.g., operating conditions of the aircraft, environmental conditions, operating conditions of motor 24/inverter 22 and/or the cooling loop 28, operating conditions of the battery 26 and/or the cooling loop 34, etc.) a controller 100 can select which of the cooling loops 28, 34 provides heat to the anti-icing zone and which of the cooling loops 28, 34 provides heat to the de-icing zone.

Figure 2:
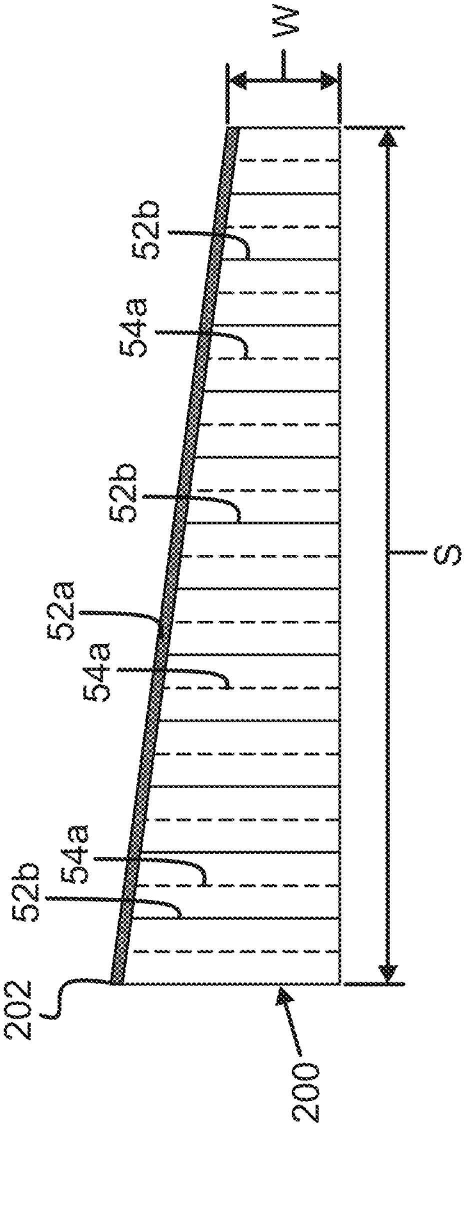
Figure 3:
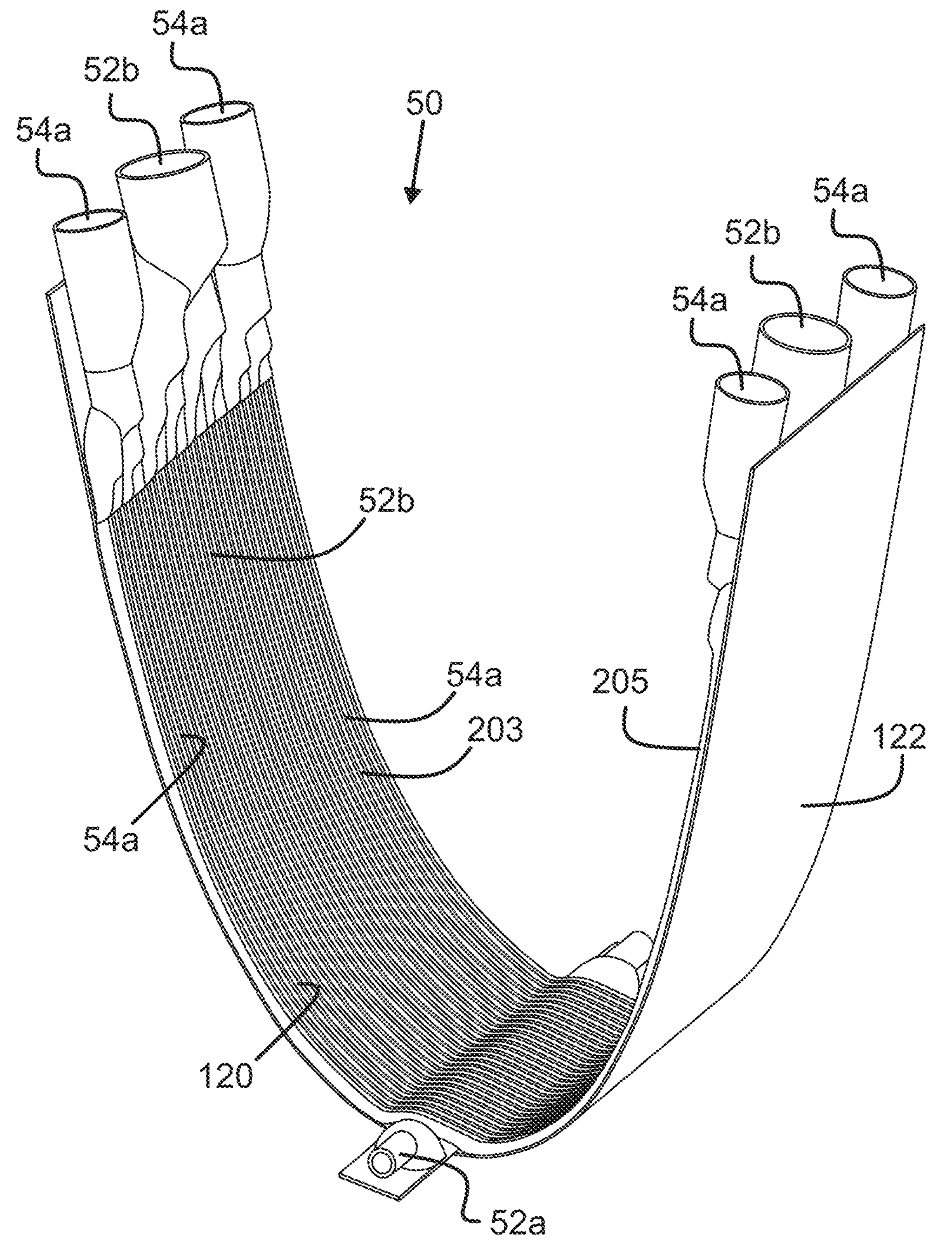
FIG. 3 depicts an example heat transfer structure in accordance with the principles of the present disclosure that can be integrated with a component (e.g., a wing) of an aircraft.

The ice protection system 20 includes a heat transfer structure 50 for heating a region of the aircraft 21 prone to icing (e.g., the wings, the pylons, the nacelles and the tail). The heat transfer structure 50 depicted at FIGS. 2 and 3 is configured for heating a wing 200 of the aircraft 21 (e.g., particularly adjacent a leading edge 202 of the wing 200). The heat transfer structure 50 includes a primary flow path 52 (e.g., one or more passages or an arrangement of passages that function(s) as a heat exchanger for a primary heating zone such as an anti-icing zone) and a secondary flow path 54 (e.g., one or more passages or an arrangement of passages that function(s) as a heat exchanger for a secondary heating zone such as a de-icing zone). As shown at FIG. 3, which depicts a portion of an example heat transfer structure, the heat transfer structure 50 can include an arrangement of fluid passages defined by a structure such as a manifold 60 with fluid passages **52*a*, 52*b* corresponding to the primary flow path 52 and other fluid passages 54*a* corresponding to the secondary flow path 54. The wing has a span dimension S that extends along a length of the wing and a width dimension W that extends from a leading edge to a trailing edge of the wing. The primary flow path 52 includes at least one passage 52*a* configured to extend along the length of the wing 200 (i.e., along the span dimension) such as at the leading edge 202 of the wing 200 when the heat transfer structure 50 is integrated with the wing 200. The primary flow path 52 also includes sets of second passages 52*b* that extend along the width dimension W of the wing when the heat transfer structure 50 is integrated with the wing. The second flow path 54 includes sets of passages 54*a* that extend along the width dimension W of the wing when the heat transfer structure 50 is integrated with the wing 200. As depicted at FIGS. 2 and 3, the sets of passages 52*b*, 54*a* are configured to be alternatingly positioned with respect to one another along the span dimension S of the wing 200 when the heat transfer structure 50 is integrated with the wing 200. The passages 52*b*, 54*a* are configured to wrap around the leading edge 202 of the wing 200 and include portions 203 (see FIG. 3) adapted to extend along a top side of the wing 200 and portions 205 adapted to extend along a bottom side of the wing 200 when the heat transfer structure 50 is integrated with the wing 200**. It will be appreciated that the depicted flow paths are provided as examples, and that other configurations of flow paths can be used as well to provide zonal heating of aircraft components for anti-icing and de-icing. Additionally, the depicted flow paths are schematic, and it will be appreciated that such flow paths/passages would be used in combination with additional supply and return flow paths to allow the heat transfer fluid to be circulated through the various flow passages.

The ice protection system 20 also includes a fluid conveyance arrangement 80 for conveying the heat transfer fluid heated by the inverter 22 and the electric motor 24 (e.g., heat transfer fluid from the first cooling loop 28) to the heat transfer structure 50. The fluid conveyance arrangement 80 can also be configured for conveying heat transfer fluid heated by the battery 26 (e.g., heat transfer fluid from the second cooling loop 34) to the heat transfer structure 50. The fluid conveyance arrangement 80 includes a valve arrangement includes a first valve structure 82 corresponding to the first cooling loop 28, a second valve structure 84 corresponding to the second cooling loop 34 and a third valve structure 86 for controlling fluid flow to and from the heat transfer structure 50. The valve structures can each include a valve such as a multi-position valve, a plurality of valves, a valve manifold, or like structures for controlling flow of the heat transfer fluid. In certain examples, the valve structures can include proportional flow valves adapted to control a flow rate provided through the proportional flow valves. In certain examples, the valve structures can shift flow to different flow paths and can provide different flow rates as directed by the controller 100.

The first valve structure 82 controls flow of heat transfer fluid through supply and return lines 150, 151 between the first cooling loop 28 and the third valve structure 86. When heat transfer fluid is not intended to be directed to the heat transfer structure 50 from the first cooling loop 28, the first valve structure 82 can close the supply and return lines 150, 151 such that all flow proceeds from the inverter 22 through the first valve structure 82 to the liquid-to-air heat exchanger 33. When heat transfer fluid from the first cooling loop 28 is intended to be directed to the heat transfer structure 50, the first valve structure 82 opens the supply and return lines 150, 151 such that a portion of the heat transfer fluid flowing through the first valve structure 82 from the inverter 22 to the liquid-to-air heat exchanger is diverted to the third valve structure 86 and the heat transfer structure 50 through supply line 150. Heat transfer fluid returning from the heat transfer structure 50 through the third valve structure 86 and the return line 151 is directed from the first valve structure 82 to the liquid-to-air heat exchanger 33.

The second valve structure 84 controls flow of heat transfer fluid through supply and return lines 152, 153 between the second cooling loop 34 and the third valve structure 86. When heat transfer fluid is not intended to be directed to the heat transfer structure 50 from the second cooling loop 34, the second valve structure 84 can close the supply and return lines 152, 153 such that all flow proceeds from the battery 26 through the second valve structure 84 to the evaporator 46. When heat transfer fluid from the second cooling loop 34 is intended to be directed to the heat transfer structure 50, the second valve structure 84 opens the supply and return lines 152, 153 such that a portion of the heat transfer fluid flowing through the second valve structure 84 from the battery 26 to the evaporator 46 is diverted to the third valve structure 86 and the heat transfer structure 50 through supply line 152. Heat transfer fluid returning from the heat transfer structure 50 through the third valve structure 86 and the return line 153 is directed from the second valve structure 84 to the evaporator 46.

The third valve structure 86 controls the flow of heat transfer fluid to and from the heat transfer structure 50. The third valve structure 86 can stop flow to and from the primary flow path 52 and/or the secondary flow path 54. The third valve structure 86 can provide flow to and from the primary flow path 52 and/or the secondary flow path 54. If it is intended for flow to be directed through one or both of the primary and secondary flow paths 52, 54, the controller 100 can use the third valve structure 86 to select which of the first and second cooling loops 28, 34 circulates heat transfer fluid through the primary flow path 52 and which of the first and second cooling loops 28, 34 circulates heat transfer fluid through the secondary flow path 54.

The ice protection system 20 further includes a controller 100 (e.g., an electronic controller including one or more processors and memory) that interfaces with the valve arrangement to control the flow of the heat transfer fluid to and through the heat transfer structure 50. The controller 100 is adapted to control the valve arrangement such that during flight the primary flow path 52 is adapted to provide an anti-icing function and the secondary flow path 54 is adapted to provide a de-icing function. Additionally, under certain conditions, flow can be directed from the first or second cooling loop 28, 34 to provide additional cooling to the cooling loops regardless of whether environmental conditions are such that anti-icing or de-icing are warranted. The controller 100 and valve arrangement allow flow through the primary flow path 52 and the secondary flow path 54 to be controlled differently from one another; but in certain examples in a coordinated way to achieve a desired heat flux. For example, the primary and secondary flow paths 52, 54 can be operated at different times, at different flow rates, for different durations, for different cycle durations and from different sources of heat transfer fluid (e.g., the first cooling loop 28 or the second cooling loop 34). In certain examples, the primary flow path 52 and/or the secondary flow path 54 can be off during flight, run continuously during flight, cycled on and off during flight, or run at certain periods or stages of the flight. The primary and secondary flow paths 52, 54 can be operated separately or independently from one another. The primary and secondary flow paths can be operated at different flow rates or at different time-periods. The primary flow path 52 and the secondary flow path 54 can be operated to provide different levels of heat flux over a given time-period. The primary flow path 52 can be operated to provide up to a first level of heat flux when operated alone, and the secondary flow path 54 can provide supplemental heating such that the primary and secondary flow paths 52, 54 can together provide a second level of heat flux greater than the first level of heat flux.

During flight, in one optional example, the controller 100 can control the valve arrangement such that the heat transfer fluid flows continuously through the primary flow path 52, and the flow of the heat transfer fluid through the secondary flow path 54 is intermittently turned on and off. In such an example, a duration that the flow through second flow path 54 is turned on and a duration that the flow through the second flow path 54 is turned off is varied by the controller 100 based on environmental data input to the controller 100 (e.g., from an input 102 such as one or more sensors, another controller, a weather data source etc.). Example environmental data can include ambient air temperature, air speed, humidity, condensation, etc. During flight the controller 100 can control flow to the primary flow path 52 to provide relatively consistent heating to prevent the formation of ice and can controls flow to the secondary flow 54 path to provide intermittent heating to promote ice shedding. During flight the controller can control flow to the primary flow path 52 so as to provide relatively constant heating to prevent the formation of ice and can cycle flow on and off through the secondary flow path 54 to promote ice shedding. The cycling on and off of flow through the secondary flow path 54 can be varied by the controller 100 based on input environmental conditions. It will be appreciated that other control strategies can also be used such as cycling of both the primary and secondary flow paths 52, 54; continuously operating the primary and/or secondary flow paths 52, 54 and optionally varying flow rate at one or both of the flow paths 52, 54 to vary heat flux; or other control strategies.

Figure 4:
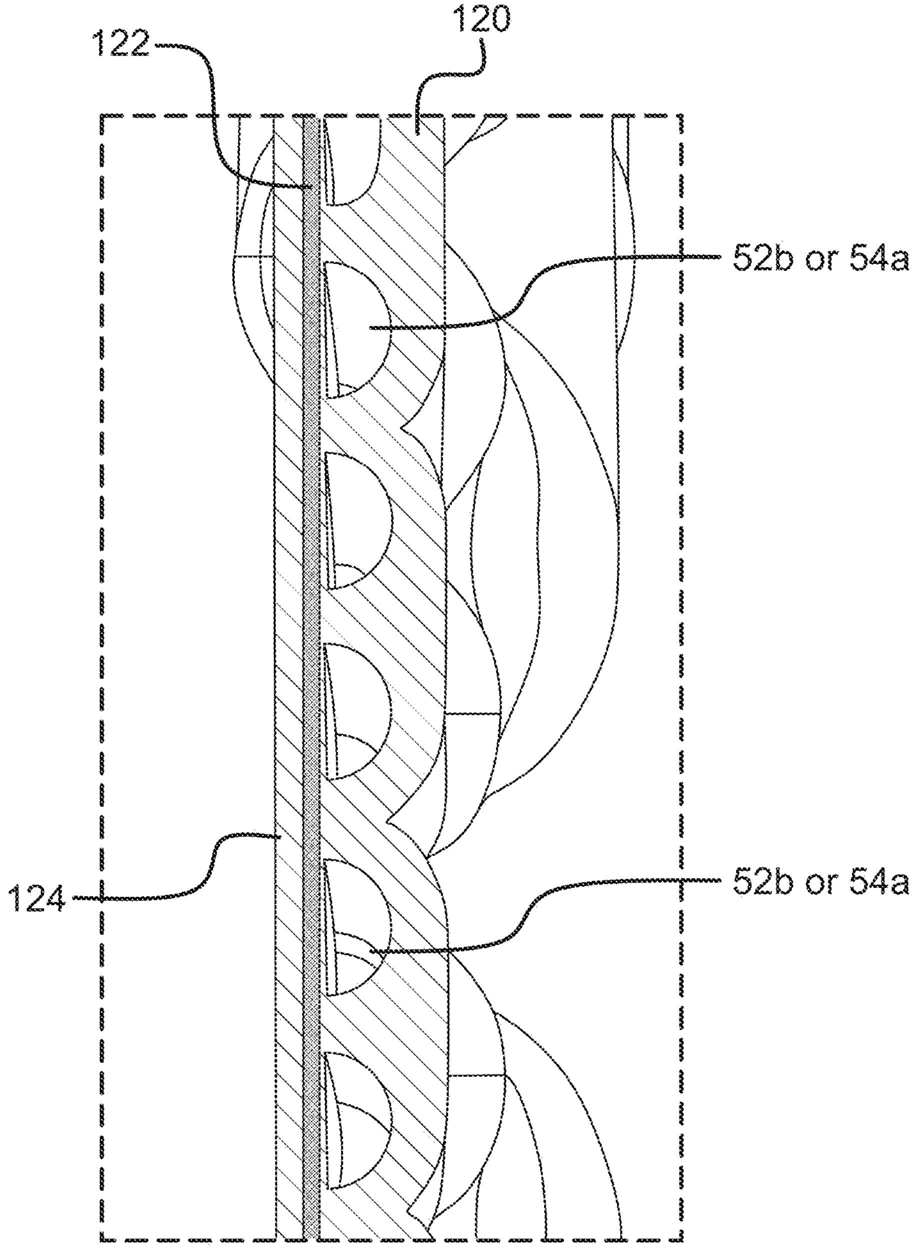
FIG. 4 is a cross sectional view taken through a portion of a heat transfer structure of FIG. 3.

Referring to FIGS. 3 and 4, the heat transfer structure 50 (e.g., heat exchanger) has a composite construction including the manifold 60 defining flow passages corresponding to the primary and secondary flow paths 52, 54. The manifold 60 includes a molded, lower-density relatively low conductive structure 120 and a higher-density relatively high conductive heat transfer sheet 122 that cooperate to define the flow passages of the heat transfer structure 50. The heat transfer sheet 122 is adapted to be secured adjacent an inner surface of a skin 124 of the aircraft to distribute heat to the region of the aircraft prone to icing. In one example, the molded, lower-density relatively low conductive structure is non-metallic (e.g., molded plastic) and the heat transfer sheet is metallic (e.g., copper, aluminum, alloys, thermally conductive composite).

In certain examples, an optional resistive electric heating structure can be used in combination with the heat transfer structure 50 to heat the region of the aircraft prone to ice formation. The resistive electric heating structure can be powered by an electric battery and can include resistive heating structures that generate heat when electrical current is directed through the heating structures. The controller 100 can activate the resistive heating structure when environmental conditions are such that the heat transfer structure 50 is not capable of providing sufficient heating. The controller can create an icing value representative of the rate of ice formation based on sensed environmental factors such as temperature, humidity, condensation, and ambient temperature. Based on the temperature of heat transfer fluid, the controller can calculate whether the heat transfer structure is capable to providing sufficient heating in view of the icing value. If not, the controller 100 can activate the resistive electric heating structure to provide supplemental heating.

Figure 5:
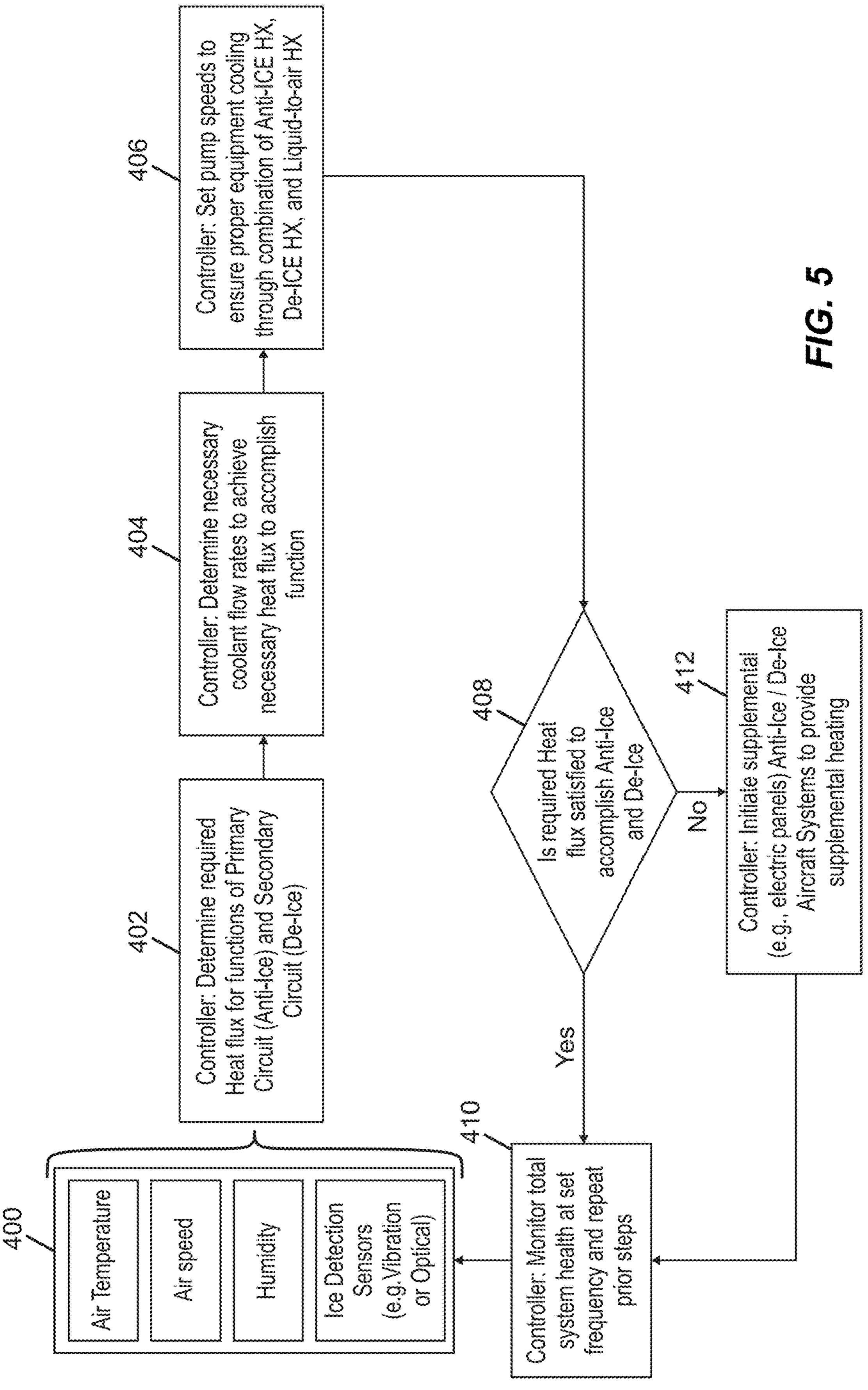
FIG. 5 is a flow chart outlining example control logic/strategy for controlling ice protection systems in accordance with the principles of the present disclosure.

FIG. 5 is a flow chart outlining example control logic employed by the controller 100 in controlling operation of the ice protection system 20. At step 400, the controller 100 accesses environmental data such as air temperature, air speed, humidity (e.g., from temperature sensors, speed sensors and humidity sensors) and determines an icing value representative of deposited critical ice thickness. The controller can also access data from ice detection sensors (e.g., vibrational or optical) to further assess a level of ice development. Next, at step 402, based on the environmental data and data from the ice detection sensors, the controller 100 determines a control strategy to achieve the required heat flux at the primary and secondary flow paths 52, 54 to achieve ice build-up protection through anti-icing and de-icing functionality. At step 404, the controller 100 can determine the required flow rates and/or duty cycles of heat transfer fluid through the primary and secondary flow paths 52, 54 to achieve the heat flux required for suitable ice build-up protection. The ice sensors can provide feedback regarding effectiveness of the system and the controller can alter the control strategy based on feedback form the ice sensors. Pumps speeds of the pump 32 of the first cooling loop 28 and/or the pump 44 of the second cooling loop 34 can be monitored and adjusted to ensure proper equipment cooling (e.g., battery and motor/inverter cooling) through cooling provided by the combination of heat transfer at the heat transfer structure 50 (e.g., at the primary and secondary flow paths), heat transfer at the liquid-to-air heat exchanger 33 and heat transfer at the evaporator 46 (see step 406). At step 408, the system can determine based on sensor input if the heat transfer structure can provide sufficient heat flux to provide acceptable levels of anti-icing and de-icing. If sufficient heat flux is provided, the process proceeds to step 410 where the system health is monitored/checked and the process then returns to step 400. If insufficient heat flux is being provided, the controller 100 can activate supplemental heating such as from a resistive heater (step 412). Upon activation of the heater, system process then proceeds to steps 410 and then returns to step 400 to repeat the processing steps outlined above.

Aspects of the present disclosure relate to systems that allow low grade heat (e.g., waste heat derived from cooling of electrical components/electrical equipment of an aircraft such as an electrically powered and propelled aircraft (e.g., an eVTOL) aircraft) to effectively be used to provide de-icing and/or anti-icing functionality. In one example, heat transfer fluid carrying the low grade heat typically has a temperature less that 110 degrees Celsius. In certain examples the low grade heat can be waste heat from an electric motor (e.g., an electric motor used to drive propulsion of the aircraft, electric motor functioning as an actuator, an electric motor driving hydraulic components such as pumps, etc.), an inverter controlling operation of an electric motor such as one of the propulsion electric motors, a battery system used to power an electric component of the aircraft such as an electric propulsion motor, an electric power system, an electric control system or other electric systems/electric components/electrical equipment.

It will be appreciated that the inverter can control the rotational speed and/or torque of the propulsion electric motor. The propulsion electric motor can be an Alternating Current (AC) electric motor and the inverter can control the frequency of power provided to the propulsion electric motor to control the rotational speed of the propulsion electric motor.

It will be appreciated that additional valving, check-valves, pumps, reservoirs, and other structures in addition to those specifically depicted can be provided to ensure proper flow and circulation through the system. The pumps can be variable flow pumps where the flow rate output from the pumps can be varied by varying the rotation speed of the pumps or by varying the displacements of the pumps. The pumps can be driven by electric motors.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. An ice protection system for use with an aircraft including an electric motor for driving a propulsion structure of the aircraft, the ice protection system comprising:

a heat transfer structure for heating a region of the aircraft prone to icing, the heat transfer structure including a primary flow path and a secondary flow path;

a fluid conveyance arrangement for circulating heat transfer fluid heated by waste heat from an electrical component of the aircraft through the heat transfer structure, the fluid conveyance arrangement including a valve arrangement; and a controller that interfaces with the valve arrangement to control flow of the heat transfer fluid to and through the heat transfer structure, wherein the controller is adapted to control the valve arrangement such that during flight the primary flow path is adapted to provide an anti-icing function and the secondary flow path is adapted to provide a de-icing function;

wherein the region of the aircraft prone to icing is a wing, wherein the wing has a span dimension that extends along a length of the wing and a width dimension that extends from a leading edge to a trailing edge of the wing, wherein the primary flow path includes a first passage that extends along the length of the wing at the leading edge of the wing, wherein the primary flow path includes sets of second passages that extend along the width dimension of the wing, wherein the secondary flow path includes sets of third passages that extend along the width dimension of the wing, and wherein the sets of second and third passages are alternatingly positioned with respect to one another along the span dimension of the wing.

2. The ice protection system of claim 1, wherein the electric motor is controlled by an inverter and powered by a battery, wherein the inverter and the electric motor are cooled by a first cooling loop and the battery is cooled by a second cooling loop, and wherein the waste heat for heating the heat transfer fluid is provided from the first or second cooling loop.

3. The ice protection system of claim 1, wherein the valve arrangement is configured to allow flow through the primary and secondary flow paths to be separately controlled.

4. The ice protection system of claim 1, wherein the controller independently controls flow through the primary flow path and the secondary flow path.

5. The ice protection system of claim 1, wherein during flight the controller operates the valve arrangement such that the primary flow path provides a first level of heat flux for providing the anti-icing function, and the secondary flow path supplements the primary flow path with additional heat flux to provide the de-icing function.

6. The ice protection system of claim 1, wherein the controller operates the primary flow path to provide a different heat flux as compared to the secondary flow path.

7. The ice protection system of claim 1, wherein during flight the controller controls flow to the primary flow path to provide relatively consistent heating to prevent formation of ice and controls flow to the secondary flow path to provide intermittent heating to promote ice shedding.

8. The ice protection system of claim 1, further comprising a resistive electric heating structure used in combination with the heat transfer structure to heat the region.

9. The ice protection system of claim 2, wherein the controller selects between the first and second cooling loops for providing the heat transfer fluid to the heat transfer structure.

10. The ice protection system of claim 2, wherein the heat transfer fluid is routed to the heat transfer structure from the first cooling loop, wherein the first cooling loop includes an air cooled heat exchanger, and wherein the air cooled heat exchanger is sized taking into consideration a cooling capability of the heat transfer structure.

11. The ice protection system of claim 2, wherein the heat transfer fluid is routed to the heat transfer structure from the second cooling loop, and wherein the second cooling loop is cooled by an evaporator of a refrigeration loop.

12. The ice protection system of claim 1, wherein the heat transfer structure has a composite construction including a manifold defining flow passages corresponding to the primary and secondary flow paths, wherein the manifold includes a molded, lower-density relatively low conductive structure and a higher-density relatively high conductive heat transfer sheet that cooperate to define the flow passages, and wherein the heat transfer sheet is adapted to be secured adjacent an inner surface of a skin of the aircraft to distribute heat to the region of the aircraft prone to icing.

13. The ice protection system of claim 12, wherein the molded, lower-density relatively low conductive structure is non-metallic and the heat transfer sheet is metallic.

14. The ice protection system of claim 1, wherein the sets of second and third passages wrap around the leading edge of the wing and include portions that extend along top and bottom sides of the wing.

15. A de-icing or anti-icing device for an aircraft component comprising:

a heat transfer structure having a composite construction including a manifold defining flow passages corresponding to primary and secondary flow paths, wherein the manifold includes a molded, lower-density relatively low conductive structure and a higher-density relatively high conductive heat transfer sheet that cooperate to define the flow passages, and wherein the heat transfer sheet is adapted to be secured adjacent an inner surface of a skin of the aircraft component to distribute heat to a region of the aircraft prone to icing.

16. The device of claim 15, wherein the molded, lower-density relatively low conductive structure is non-metallic and the heat transfer sheet is metallic.

17. An ice protection system for use with an aircraft including an electric motor for driving a propulsion structure of the aircraft, the ice protection system comprising:

a heat transfer structure for heating a region of the aircraft prone to icing, the heat transfer structure including a primary flow path and a secondary flow path;

a fluid conveyance arrangement for circulating heat transfer fluid heated by waste heat from an electrical component of the aircraft through the heat transfer structure, the fluid conveyance arrangement including a valve arrangement; and a controller that interfaces with the valve arrangement to control flow of the heat transfer fluid to and through the heat transfer structure, wherein the controller is adapted to control the valve arrangement such that during flight the primary flow path is adapted to provide an anti-icing function and the secondary flow path is adapted to provide a de-icing function;

wherein the heat transfer structure has a composite construction including a manifold defining flow passages corresponding to the primary and secondary flow paths, wherein the manifold includes a molded, lower-density relatively low conductive structure and a higher-density relatively high conductive heat transfer sheet that cooperate to define the flow passages, and wherein the heat transfer sheet is adapted to be secured adjacent an inner surface of a skin of the aircraft to distribute heat to the region of the aircraft prone to icing.

18. The ice protection system of claim 17, wherein the molded, lower-density relatively low conductive structure is non-metallic and the heat transfer sheet is metallic.

* * * * *